US006000582A

United States Patent [19]

Forstmann

[11] Patent Number: 6,000,582

[45] Date of Patent: Dec. 14, 1999

[54] CARTRIDGE AND CARTRIDGE SYSTEM

[75] Inventor: Frank Forstmann, Dusseldorf, Germany

[73] Assignee: Sipag GmbH Verpackung & Service, Düsseldorf, Germany

[21] Appl. No.: 08/952,021

[22] PCT Filed: Feb. 28, 1997

[86] PCT No.: PCT/EP97/01022

§ 371 Date: Feb. 13, 1998

§ 102(e) Date: Feb. 13, 1998

[87] PCT Pub. No.: WO97/31840

PCT Pub. Date: Sep. 4, 1997

[30] Foreign Application Priority Data

| | | | |
|---|---|---|---|
| Mar. 2, 1996 | [DE] | Germany | 196 08 128 |
| Dec. 20, 1996 | [DE] | Germany | 296 22 174 |
| Dec. 20, 1996 | [DE] | Germany | 296 22 175 |

[51] Int. Cl.$^{6}$ .......... G01F 11/06

[52] U.S. Cl. .......... 222/327

[58] Field of Search .......... 222/327, 386.5

[56] References Cited

U.S. PATENT DOCUMENTS

| | | | |
|---|---|---|---|
| 2,853,209 | 9/1958 | McArdle . | |
| 3,315,847 | 4/1967 | Trumbull | 222/386.5 |
| 3,353,537 | 11/1967 | Knox et al. . | |
| 4,854,485 | 8/1989 | Collins . | |

FOREIGN PATENT DOCUMENTS

| | | |
|---|---|---|
| 0 250 890 | 1/1988 | European Pat. Off. . |
| 1270689 | 7/1960 | France . |
| 2067177 | 8/1971 | France . |
| 2 749 194 | 12/1997 | France . |
| 29622174 | 3/1927 | Germany . |
| 1536003 | 10/1969 | Germany . |
| 34 40 893 A1 | 5/1986 | Germany . |
| 34 44 042 A1 | 6/1986 | Germany . |
| 8709845 | 10/1987 | Germany . |
| 39 25 868 A1 | 2/1991 | Germany . |
| 9416978 | 2/1995 | Germany . |
| 4400358 | 7/1995 | Germany . |
| 44 22 459 A1 | 1/1996 | Germany . |
| 19513240 | 6/1996 | Germany . |
| 29622175 | 3/1997 | Germany . |

*Primary Examiner*—Philippe Derakshani

*Attorney, Agent, or Firm*—Robert W. Becker & Associates

[57] ABSTRACT

A cartridge for flowable material has a flexible envelope having a first and a second opposed ends and defining an envelope volume for receiving the flowable material. A plunger is positioned at the first opposed end. A cover member is positioned at the second opposed end. The second opposed end has a dispensing opening. The dispensing opening has a dispensing diameter so dimensioned, according to a force exertable by the plunger in the envelope volume, a viscosity of the flowable material, and a flexibility of the envelope, as to ensure a minimum inner pressure in the envelope volume in order to prevent inward folding of the envelope into the interior of the envelope volume.

42 Claims, 7 Drawing Sheets

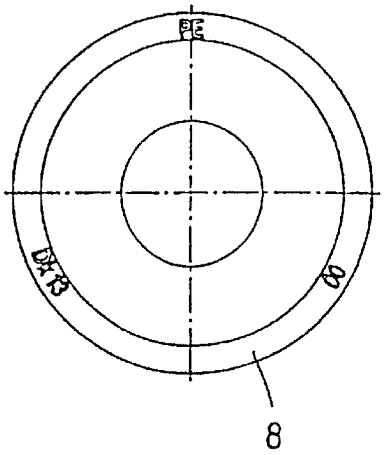
Fig. 6
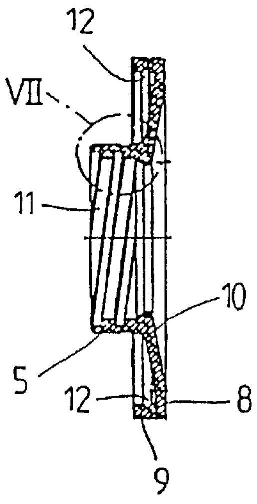
Fig. 5
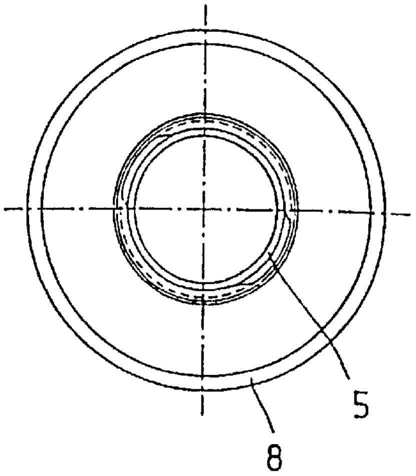
Fig. 4
Fig. 7
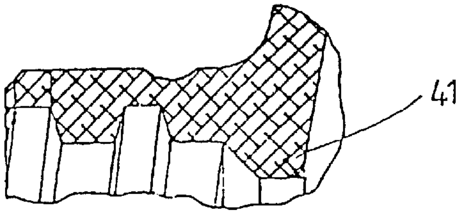
Fig. 9
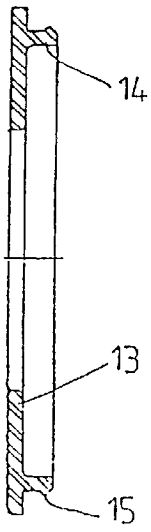
Fig. 8
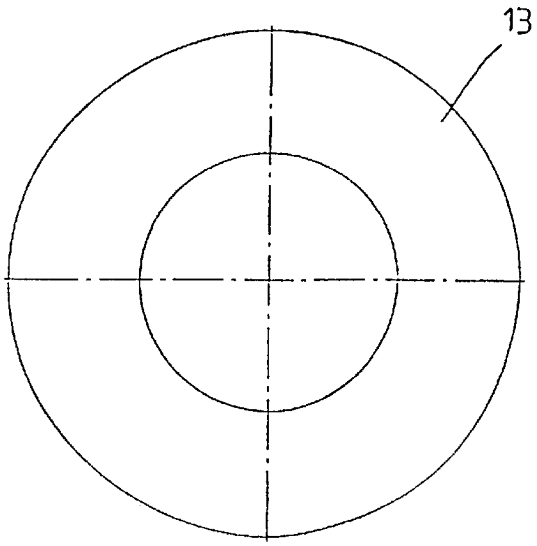

Fig. 19
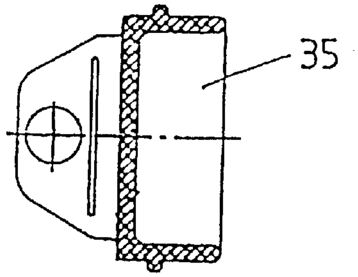
Fig. 18
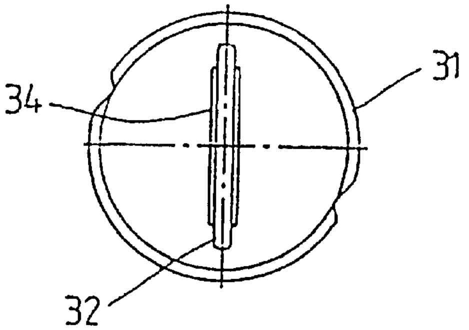
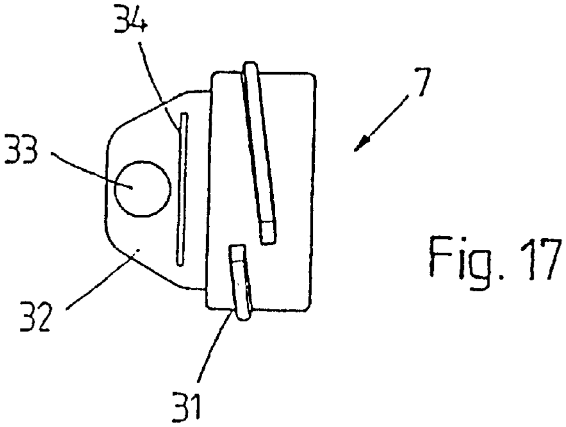
Fig. 17.
Fig. 20
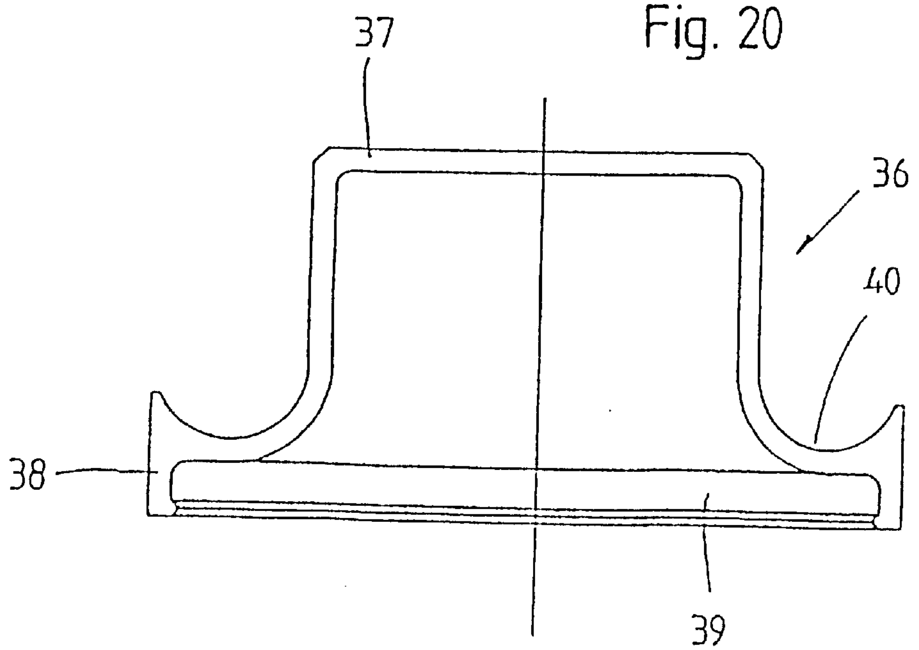

CARTRIDGE AND CARTRIDGE SYSTEM

BACKGROUND OF THE INVENTION

The invention relates to a cartridge for flowable media, comprising an envelope of a flexible material delimiting a volume, wherein the envelope can be provided at one end with a plunger-type pressing element and at the other end with an outlet element.

Cartridges for flowable media are known per se. They are containers for storing, transporting, and dispensing flowable media. Primarily, paste-like medias such as silicone rubber etc. are concerned, which are, for example, used in the construction industry. However, it is also known to fill adhesives, grease or other media into cartridges.

Different types of cartridges are known. In one type a sleeve or envelope delimiting a volume is provided in the form of a stable housing-like element which, in general, is provided at one end with a dispensing area and at the other end with an opening for a piston-like pressing element. The dispensing area comprises conventionally a dispensing opening, whereby it is known to close off the opening is by an element that is a unitary part of the envelope. When needed, this closing element is opened by cutting it open so that the dispensing opening results. In the area of the dispensing opening a socket provided with an inner or outer thread can be provided onto which a dispensing nozzle is placed. Such cartridges are primarily made of plastic so that with respect to their manufacture and disposal many expenditures are incurred.

The containers are primarily disposable containers because they cannot be completely emptied and they cannot be universally employed. Since the most favorable plastic is always selected for manufacturing the cartridges, they are not universally employable for all materials, but for different media different types of cartridges must be produced. A further problem is the incomplete and unsatisfactory emptying of the cartridges. Furthermore, it is easily possible that the operator becomes contaminated with the media. Finally, the produced empty cartridges are already of a size during transport to the filling station as they are after filling, i.e., they require a large transporting volume.

Stiff, tubular cartridges with a pressing area at one end and with a piston-shaped pressing element at the other end are emptied with a dispensing device into which the tubular element is clamped and with which the pressing element is moved by way of a pressure piston.

It is known to use, instead of the cylindrical containers, a hose container for the media to be dispensed. Such hose containers are comprised substantially of a foil hose which is closed off at both ends. It is known to close off the ends by so-called metal clips. The use of such hose containers is suggested primarily to avoid the disposal of a plurality of emptied cylindrical containers. The manufacture of hose containers is simpler and so is their disposal. Since the hose containers are not shape-stable, they are inserted into shape-stable cylindrical sleeves for dispensing the media contained therein whereby the sleeve has at one end a closure with a dispensing opening, for example, for arranging thereat a nozzle tip. At the other end of the cylindrical outer sleeve pressure can be applied onto the hose container. For dispensing the material contained in the hose container, the container must be opened, which in practice is achieved by destroying the hose container sleeve by slitting, puncturing etc. After emptying, the hose containers are removed from the cylindrical sleeves so that only a small, substantially empty hose container must be disposed of. Even though this is advantageous in comparison to cylindrical plastic cartridges, such hose containers have the disadvantage that they can only be used up to a certain filling volume, and it is especially disadvantageous that the dispensing device can be contaminated with the contained material. Also, the operator is usually also coming into contact with the medium. Often, a complete plugging of the dispensing means results so that, in practice, they must be disposed of also. Accordingly, the desired advantages are eliminated and the environmental impact caused by the disposal of the hose containers, on the one hand, and of the dispensing devices, on the other hand, is considerably increased. These disadvantages are even further complicated by the contamination of the operator, at the latest during removal of the hose container from the dispensing devices.

Hose containers are not shape-stable so that for dispensing of the media contained therein they must be inserted into a shape-stable cylindrical sleeve having at one end a closure with a dispensing opening, for example, for arranging thereat a nozzle tip. At the other end of the cylindrical outer sleeve pressure can be exerted on the hose container.

All of the cartridges of the aforementioned kind therefore have in common that their disposal is difficult and results in high disposal costs. Furthermore, the known cartridges cannot be universally employed, are inflexible with regard to their volume, and have disadvantages with respect to their uncontrollable handling.

Dispensing devices for cartridges of the aforementioned kind are known per se. A cylindrical receiving element, that is tubular or part-cylindrical, depending on the type of cartridge, has a dispensing area and a pressure generating device. The latter can be, for example, a pressure piston with which, by moving a lever, vacuum or an increased pressure within the cylindrical receiving element can be produced.

A prior art device has a pump piston which produces vacuum at the dispensing end of the cartridge, i.e., at the dispensing area of the cylindrical receiving member, and the flowable material thus is sucked out of the cartridge after opening.

However, it was found that such dispensing devices do not guarantee a complete emptying of the cartridges and, furthermore, do not ensure a defined behavior of the cartridge even within the tubular or cylindrical receiving member. A defined behavior is, for example, required for newer cartridges in order to ensure, on the one hand, a defined emptying of the remaining material and on the other hand a controlled folding of the cartridge material in order to make the empty cartridge to be disposed of as small as possible.

It is therefore an object of the present invention to provide a cartridge which is economical with regard to its manufacture and its filling, which is comprised of only a small amount of plastic and which only causes a minimal environmental impact upon disposal. Furthermore, an application as universally as possible should be provided, emptying as much as possible should be ensured, and a small transport volume should be provided.

Furthermore, the present invention provides a cartridge system which, in addition to a novel cartridge, also comprises a dispensing device and a pressure piston. With this complete cartridge system all economical and technical advantages of the new inventive cartridge can be optimally used and an optimal economic application is realized.

SUMMARY OF THE INVENTION

As a technical solution of the object a cartridge for a flowable medium is provided in which a sleeve or envelope of a flexible material delimits a volume, whereby at one end a piston-like pressing element and at the other end a cover member is provided whereby in the area of the cover member a dispensing opening is provided having a diameter so dimensioned, under consideration of the forces to be supplied by the pressing element, the viscosity of the flowable medium, and the flexibility of the envelope, as to ensure an inner pressure within the volume defined by the envelope which effectively counters the tendency for folding of the envelope material into the interior of the envelope volume.

The invention provides a cartridge in which a number of components are adjusted to one another in a defined manner in order to produce a concrete, reliable result. In this respect, the pressing forces resulting from geometry of the piston of the piston-shaped plunger and the diameter of the dispensing opening are matched to one another. In addition, the viscosity of the flowable medium and the flexibility of the envelope are taken into consideration in order to maintain a minimum inner pressure within the volume delimited by the envelope so that the envelope material will not fold into the interior of the envelope volume. The term folding in the context of the present invention is to be understood such that the flexible material cannot have the tendency to fold in areas in which there is still medium present in the envelope, especially not a folding tendency transverse to the pressing direction. Such folding would mean a compression of the flexible envelope in the area between the pressing piston and the dispensing opening so that a reliable scraping, and, as will be explained in the following, a reliable inversion is no longer ensured. The inventive solution provides in an especially advantageous manner a number of technical features. On the one hand, the already mentioned complete scraping of the envelope body at its inner surface is possible. As a function of the outer circumference of the piston element a defined scraping cross-section results which is not changed or impeded by the possible folding of this envelope material. Another technical feature is the inversion of the scraped material. It is obvious that the technical solution cannot be simply reduced to the fact that a dispensing opening as small as possible is selected because this would impede the desired technical application of the cartridge. The dispensing opening, in contrast, fulfills the requirement of a defined material flow, based on the dispensing conditions but, in cooperation with the other parameters, also provides the necessary minimum pressure. Also, defined and reproducible conditions must be obtained and not random results, for example, based on cutting-to-length a dispensing nozzle etc.

With the inventive design an envelope of a foil material that is not stiff by itself can be produced and in a defined manner can be used for dispensing the contained medium. During dispensing and during interruptions the envelope is stable due to the pressure within the interior and thus provides for a simple and reliable handling. Due to the excellent scraping properties the emptying of the remaining material is improved. It is also possible to use envelopes of a very large filling volume because due to the defined inner pressure they will still have enough stability to be handled. The envelope can be produced by using only a minimal amount of plastic and thus contributes to energy savings during manufacture and especially to reduction of disposal costs.

It is especially advantageous that the envelope is comprised of at least one foil. Advantageously this is a plastic foil. It is possible to employ inexpensive plastic materials such as polyethylene (PE) or high density polyethylene (HDPE), which are very inexpensive materials. In an advantageous manner the envelope comprises at least one diffusion-resistant layer whereby preferably aluminum is suggested. The envelope can be stabilized as a function of its size by additional fabrics, for example, nylon etc. In an advantageous manner the envelope is hose-shaped with a substantially round cross-section.

The cover member is a disk-shaped or cup-shaped element according to an advantageous embodiment of the invention. In an advantageous manner it is connected to one end of the sleeve so as to close it off. The envelope is preferably produced from a foil hose and is connected with one end along the entire circumference to the cup-shaped cover member. The cup-shaped cover member is advantageously comprised of plastic and can be coated with a further advantageous diffusion-resistant coating, for example, aluminum foil. In order to produce the connection, the outlet element may be provided with grooves into which a clamping element is clipped whereby the foil of the envelope is clamped therebetween. The clamping element is advantageously disk-shaped.

It is especially advantageous that the cover member is cup-shaped and that the grooves are provided at the cylindrical inner wall of the cup. The cover member is inserted into the envelope with the bottom of the cup facing the interior of the envelope. The envelope edge is then folded over the edge of the cup. An annular or disk-shaped clamping element is then snapped into the cup and will rest therein within the grooves. The envelope material positioned therebetween is therefore clamped. With this embodiment the pulling forces acting on the envelope material are thus reduced multiple times by multiple deflections.

The cover member comprises advantageously an opening socket which forms the dispensing opening. The opening socket can be provided at its interior or exterior with a thread, preferable a trapezoidal thread. A filling device or a dispensing nozzle can be connected to the trapezoidal thread. The trapezoidal thread has a special advantage in that it can receive pressure forces effectively.

The opening socket can be closed off by a closure cap threaded into the thread. The closure cap can advantageously have a grip stay for gripping it and can furthermore be provided advantageously with a bore, for example, in order to suspend the cartridge. The closure cap can be inserted preferably by interposing a foil element, preferably, a diffusion-resilient foil element.

With the inventively disclosed embodiment a cartridge is provided that, in comparison to the prior art, is completely new and, despite its economical manufacture, can be resealed. By interposing a foil piece, for example, an aluminum cap, which may also be plastic-coated, the envelope volume can be closed off in a diffusion-stable manner. Thus, it is also possible to close off the once opened volume for later use of the contained medium.

The nozzle connected to the opening socket has a threaded area and a nozzle portion.

The piston-shaped pressing element is according to an especially advantageous embodiment of the invention, a cup-shaped plunger. This element, comprised preferably of plastic, can be connected to the envelope at one end thereof in order to close it off, as suggested with an especially advantageous embodiment of the invention. The cup-shaped plunger is then inserted into the envelope with its cup bottom leading and is then connected with its circumferential area to the envelope material of the envelope. The cup bottom contour corresponds to the negative shape of the bottom of the cover member so that the degree of emptying is substantially increased. In an especially advantageous manner, the circumference of the plunger is provided with a wiping edge in order to scrape the interior of the envelope when the plunger is forced through the envelope.

For attaching the plunger to the envelope material, it is suggested in an advantageous manner to provide a snap-on groove and to employ a clamping element so that also in the area of the pressing element a type of connection is possible that has already been disclosed in connection with the cover member. The plunger as well as the cover member can be connected in any other suitable manner to the envelope material, for example, by an adhesive, welding, etc.

The plunger, according to an advantageous embodiment of the invention, may be provided with reinforcement ribs.

Due to the aforedescribed inventive embodiment a cartridge can be produced in a simple manner by using a foil hose which at one end is closed off by a cover member attached by a clip connection and at the other end by the plunger element attached by a clip connection. The inventive embodiment ensures, while using simple and economically producible elements, also a simple application and economical disposal because the materials can be selected by taking into consideration disposal problems. A special advantage is that the plunger can be guided through the interior of the envelope volume to the cover member whereby the flexible envelope material is folded over into the area of the plunger rear edge. Once the plunger face of the plunger has reached the bottom of the cover member, the envelope has been shortened by half its length within itself. This especially advantageous aspect of the invention has a number of advantages. After manufacture of the inventive cartridge it is possible to move the plunger to the cover member either by simple vacuum generation or by pushing the plunger through the interior volume. The envelope to be transported while empty is thus only half as long as a plastic cartridge of the same filling volume. Thus, the transporting costs are considerably reduced, i.e., by at least 50%. Due to the flexibility of the envelope a further reduction is possible when using corresponding packing methods. For filling, the plunger can be returned into its original position by applying a slight pressure and the envelope can be completely filled. It is also advantageous that practically no air is present in the interior of the envelope at the beginning of the filling process. When using the device as suggested, the plunger is then moved by a suitable pressing device in the direction toward the cover member. Due to the selected dimensioning of the plunger face under consideration of the viscosity of the medium and the flexibility of the envelope as well as the dimensioning of the outlet opening in the area of the cover member, there is always sufficient inner pressure within the interior of the envelope for stabilizing the envelope and forcing the envelope outwardly to thereby avoid or prevent folding. Thus, the envelope can be completely scraped empty by the moving plunger and, this is especially important, the envelope is not compressed between the plunger and the cover member but instead is easily folded behind the plunger and follows the plunger because the end of the envelope is fastened to the plunger. The plunger is positioned at the cover member upon complete emptying of the envelope. Thus, the degree of emptying is correspondingly excellent and surpasses in any respect the legislative regulations. The emptied cartridge can thus not contaminate the operator and can be disposed of with considerable reduction of the disposal costs. The amount of plastic, in comparison to conventional cartridges, can be considerably lowered, for example, by 70%.

When interrupting use of the cartridge before it is completely emptied, the cartridge can be resealed by a closure cap. It is possible to insert in an inventive manner a cover plate or cover cap. The reservoir remaining within the cartridge can thus be stored again.

When a cartridge is filled in the aforementioned manner, at the end of the filling process, a closure cap is also fastened by interposing a closure element. The closure element in the form of a preferably deep-drawn foil cap provides the original closure and must be destroyed before dispensing the medium.

In an especially advantageous manner, the contour of the closure bottom is designed such that together with the filled inner volume, on the one hand, a defined amount of filling volume and, on the other hand, a defined inner pressure is also ensured. For this purpose, the closure cap can be provided, for example, with a defined bore in which during filling a remaining medium amount is received in a defined manner.

It is especially suggested that the dispensing opening, which is responsive to the inner pressure, is provided in the area of the cover member opening. The cover member has, as disclosed above, an opening socket having in its interior an outlet opening. In the area of this socket an opening of a defined diameter can be formed which represents the inventively designed pressure-effective dispensing opening.

In the alternative, it is suggested in an advantageous manner that the pressure-effective dispensing opening is provided within the threaded portion of the nozzle. Nozzles are embodied in a manner known per se with a predetermined length having a tapering cross-section. The operator can then cut to length the nozzle as desired to generate the required nozzle diameter. However, this area is not pressure-effective in the sense of the present invention, because the pressure-effective dispensing opening is provided within the lower portion of the nozzle, preferably within the threaded portion, which is not to be cut to length.

Of course, it is within the gist of the invention to embody the pressure-effective dispensing opening in a combined manner at the cover member and at the nozzle.

Advantageously, it is suggested with the present invention that the cover member outlet opening tapers with its end facing the envelope volume in an annular manner. Due to this annular tapering of the outlet opening a sealing lip, respectively, sealing surface is provided onto which, for example, the nozzle or the closure cap can be threaded. Furthermore, in a simple manner a foil can be applied which can be an effective diffusion-resistant closure and connect in the manner as described above as the original seal.

It is also suggested with the present invention that the already empty part of the envelope behind the plunger can be compressed in the axial direction. With this measure, which can be realized, for example, by a respective design of the pressing device, the final volume of the empty envelope is reduced to a minimal portion of its original length which is also favorable with regard to disposal.

With the present invention a completely new cartridge type is realized which provides excellent economical manufacture, an economical transport of the empty cartridges, and simple filling action. The inventive cartridge, since primarily foil-like materials are used, can be designed for a substantially universal application, for example, by employing polyethylene-coated aluminum foil. The complete weight can be reduced to one third of conventional plastic cartridges in the empty state. The transport cost savings of the empty cartridges are thus substantial. After filling, the cartridges can accommodate also large filling volumes because a pressure filling is possible in a simple manner. Due to the design with defined cooperation of components that takes into consideration different parameters, it is primarily ensured that a reproducible behavior of the cartridge during emptying is realized so that in a defined manner the degree of emptying and the resulting defined and reproducible disposal size is ensured. Due to the defined inversion of the envelope accomplished by maintaining the minimal inner pressure, the envelope is carefully scraped and at least reduced to half its length by folding. A further compression is favorable in regard to disposal. In an especially advantageous manner the inventive cartridge can be sealed after filling with a diffusion-resistant original seal and is also advantageously resealable.

With regard to the cartridge system the invention also suggests a pressure piston with a pressure surface area at one end of a substantially cylindrical piston wall portion. It comprises an annular flange at the end face opposite the pressure surface area. The annular flange has an annular groove facing the pressure surface area.

With the inventive pressure piston it is achieved that the pressure surface within the cartridge causes the desired dispensing of the cartridge contents while the cartridge walls for a sufficient movement of the pressure piston will contact the annular groove and will be guided by it from the longitudinal direction into the transverse direction. Since the envelope is cylindrical, the inwardly oriented transverse forces result in considerable tension in the area contacting the annular groove so that the cartridge is folded in this area.

The pressure piston, according to an advantageous suggestion of the invention, is provided with a fastening bore for the push rod of a pressure device. The pressure piston may also be a component of a pneumatic or hydraulic pressure device. The fastening bore for the pressure plunger, according to an advantageous embodiment, is a central threaded bore.

It is also advantageously suggested that the piston wall portion extends conically, preferably from the pressure surface to the annular groove such that its diameter increases in this direction.

The pressure piston, according to an advantage ous embodiment of the invention, is a plastic element. Such elements can be economically produced as an injection-molded part.

The invention provides a pressure piston for pressing cartridges, especially cartridges with flexible envelope material, that can be easily produced and can be effectively handled. Such a pressure piston can be used to retrofit existing dispensing devices.

Furthermore, with respect to the cartridge system it is suggested with the inventive device to provide a dispensing device such that an almost complete emptying of an inserted cartridge, on the one hand, and a predetermined compression of the cartridge, on the other hand, are ensured. It is suggested with the invention to provide a dispensing device for flowable media contained in cartridges with at least one substantially cylindrical receiving member for a cartridge, at least one dispensing area for the flowable medium at one end portion of the receiving member, and a device for producing a pressure that deviates from normal pressure at one end portion of the receiving member. A second device for producing a pressure deviating from the normal pressure is provided with which a pressure is produced at the other end portion deviating from the normal pressure in the opposite direction.

Thus, the invention intends to produce a vacuum at the dispensing area of the receiving member and to produce, in addition, an increased pressure at the opposite end. Due to the adjustability, respectively, controllability of the pressure ratios it is automatically achieved that emptying can be controlled, on the one hand, while, on the other hand, the material behavior of the inserted cartridge can be controlled.

It is thus inventively suggested that the second device is a piston element. It produces preferably an air pressure which deviates from normal pressure. In an especially advantageous manner it is suggested that the pressure-generating device is a double piston element. Such a double piston element can produce upon movement in one direction at one cylinder end a vacuum and upon movement in the other direction at the other cylinder end an increased pressure. This requires only a respective line design. The double piston element can preferably be actuated by a lever whereby a single or two moveable levers can be used. The pressure deviating from normal pressure is advantageously lowered air pressure, respectively, increased air pressure.

BRIEF DESCRIPTION OF THE DRAWINGS

Further advantages and features of the invention result from the following description in conjunction with the figures.

It is shown in:

FIG. 4 a plan view of a cover member;

FIG. 5 a sectional view of the cover member according to FIG. 4;

FIG. 6 a bottom view of the cover member according to FIG. 4;

FIG. 7 a view of detail VII according to FIG. 5;

FIG. 8 a plan view of a clamping disk;

FIG. 9 a sectional view of the clamping disk according to FIG. 8;

FIG. 17 a side view of a closure cap;

FIG. 18 a plan view of the closure cap according to FIG. 17;

FIG. 19 a sectional view of the closure cap according to FIG. 17;

FIG. 20 a schematic view of an embodiment for a pressure piston;

DESCRIPTION OF PREFERRED EMBODIMENTS

Figure 1:
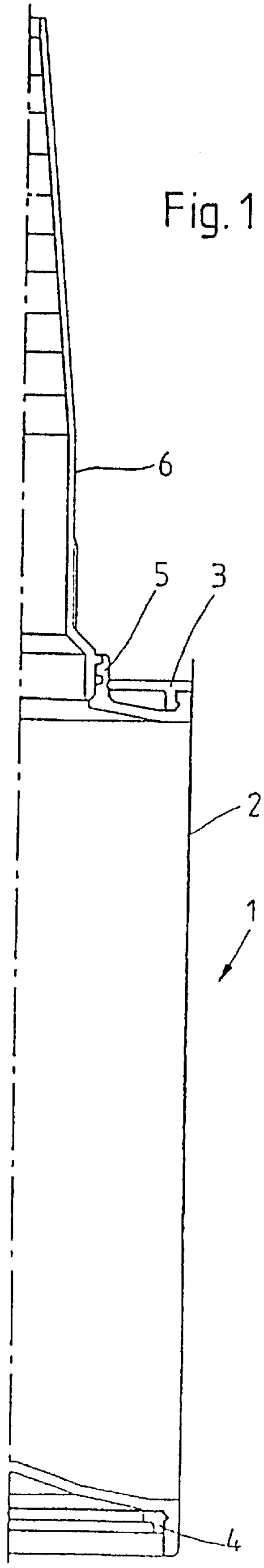
FIG. 1 a schematic part-sectional representation of a cartridge half in one embodiment.

The embodiments of a cartridge and individual parts thereof shown in the Figues serve to illustrate the invention. The cartridge 1, shown in FIGS. 1 through 3, comprises an envelope 2 that delimits a volume, and in the shown embodiment, is in the form of a cylindrical envelope. The envelope is, for example, a composite foil of PE, AL as an impermeable layer, i.e., a diffusion-resistant layer, that is resistant to vapor, gas, UV radiation, etc. as well as a composite stabilization by BO-NY (biaxially oriented nylon). The foil forms a cylindrical hose which at one end is closed off by a cover member 3 and at the other end by a plunger 4. The foil 2 is fixedly connected to the cover member 3 as well as to the plunger 4. The cover member 3 comprises an opening socket 5. In the embodiment according to FIG. 1, a nozzle 6 is threaded into the opening socket which has an inner thread. In the embodiment according to FIG. 2, a closure cap 7 is introduced into the opening socket 5 instead of the nozzle 6. In the embodiment according to FIG. 3, the cartridge 1 is in a state in which the plunger 4 is moved into the interior of the envelope 2 to the cover member 3. This is either the transport position in which the cartridge has only half its standard length or is the position after complete dispensing. In FIG. 3 it is also shown that the contour of the plunger face is substantially congruent to the contour of the cover member bottom so that a substantially complete emptying is possible. The envelope 2 is inverted behind the plunger 4. In this position a light and small transporting unit for filling is provided. After emptying a small unit that is easy to dispose of results whereby the folded envelope 2 according to FIG. 3 can be further compressed by a corresponding device.

With respect to the further Figures the individual construction elements of the cartridge will be explained.

FIGS. 4 through 9 show an embodiment of a cover member. In FIG. 4 a cover member 8 is shown in a plan view which comprises the centrally arranged opening socket 5. The sectional representation according to FIG. 5 shows that the cover member is substantially cup- or pan-shaped and has an edge 9. The bottom 10 has a contour which facilitates complete emptying and air-free filling. In the interior of the opening socket 5 a trapezoidal thread 11 is provided. The trapezoidal thread serves for fastening a nozzle or a closure cap. The embodiment of the thread 11 as a trapezoidal thread facilitates compensation of pulling and pressure forces during filling as well as during dispensing. In the inner portion of the edge 9 an annular groove 12 is provided. As can be seen in the detailed representation according to FIG. 7, in the area of the transition from the bottom 10 into the opening socket 5 the opening tapers annularly. This tapered ring 41 has numerous functions. On the one hand, its design at the side of the thread is such that it provides a sealing surface which favors sealing relative to a nozzle or a closure cap.

The aforementioned annular groove 12 serves for receiving a clamping disk 13 which, as shown in FIG. 9, has an annular stay 14 with an outwardly positioned cam ring. The cover member 8 is inserted such into the hose sleeve so that the bottom 10 faces the volume defined by the envelope. The edges of the foil sleeve project past the edge 9 of the cover element 8 and are folded in the direction toward the opening socket 5. Subsequently, the clamping disk 13 is slipped over the opening socket 5 until the cam ring 15 snaps into the annular groove 12 to thereby clamp the hose foil material over the entire annular circumference. This produces a diffusion-tight and pressure-tight connection between the foil hose and the cover member.

Figure 12:
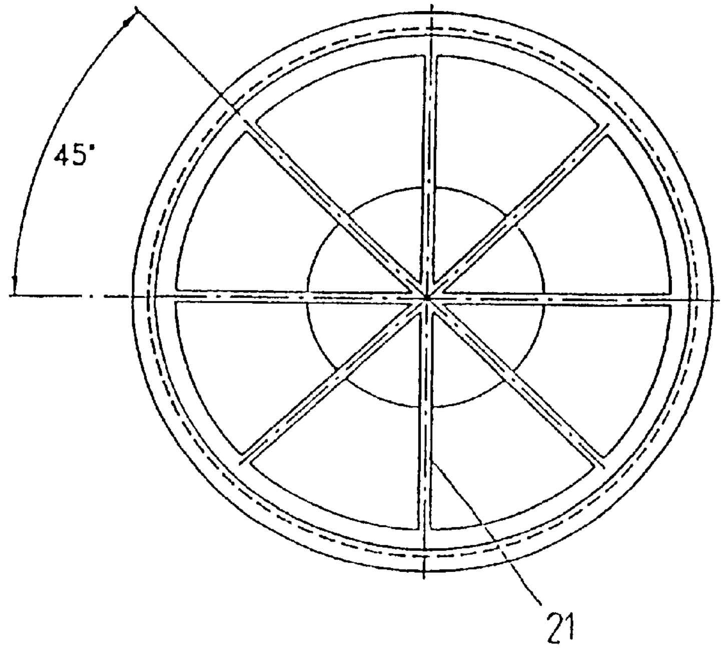
FIG. 12 a bottom view of the plunger according to FIG. 10.
Figure 14:
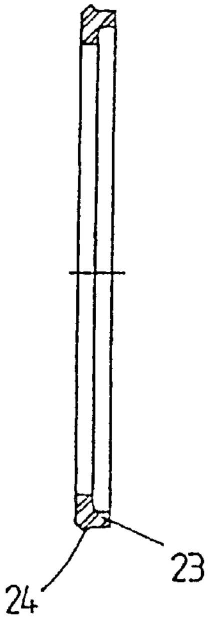
FIG. 14 a sectional view of the clamping ring of FIG. 13.
Figure 13:
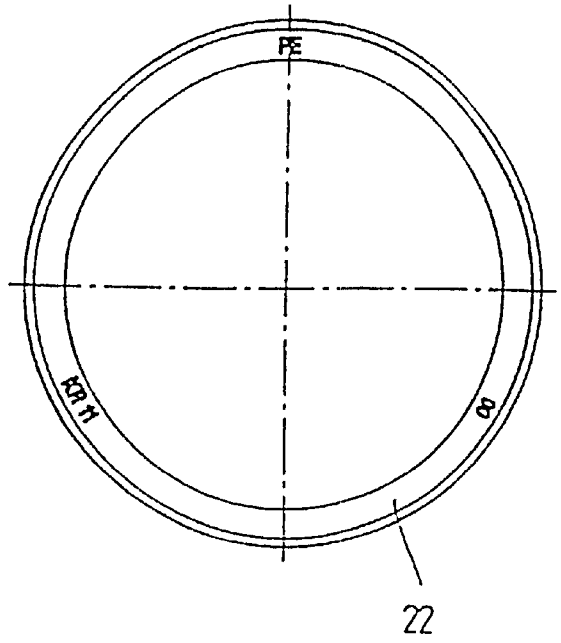
FIG. 13 a plan view of a clamping ring.

In FIGS. 10 to 14 an embodiment of a plunger is shown. The plunger is comprised of a plunger head 16 which has a plunger face 17 of a curved contour 18 that has a transition into the plunger edge 19. The transition is extremely angular and the plunger edge 19 can be embodied so as to conically taper away from the plunger face. This results in a sharp angle that facilitates scraping of the inner side of the foil. In the interior of the cup defined by the plunger edge 19 and the backside of the plunger face 17 an annular groove 20 is provided. A clamping ring 22 can be inserted into it which is shown in FIGS. 13 and 14. It has in the area of the annular stay 23 an annular bead 23 which can be snapped into the annular groove 20. Here the end of the foil hose can also be folded so that the plunger face 17 faces the interior of the envelope and projects past the plunger edge 19. Upon insertion of the clamping ring 13 and snapping of the annular bead 24 into the annular groove 20, the foil edge material is clamped and a tight and secure connection results. The plunger head 16 as is shown in the bottom view of FIG. 12, is provided with reinforcing ribs which in the shown embodiment have an angle of respectively 45° relative to one another.

Figure 2:
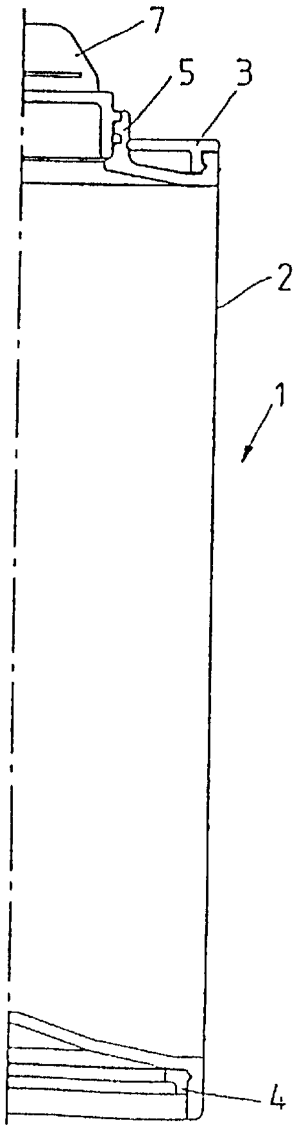
FIG. 2 a representation according to FIG. 1 in another operational state.
Figure 3:
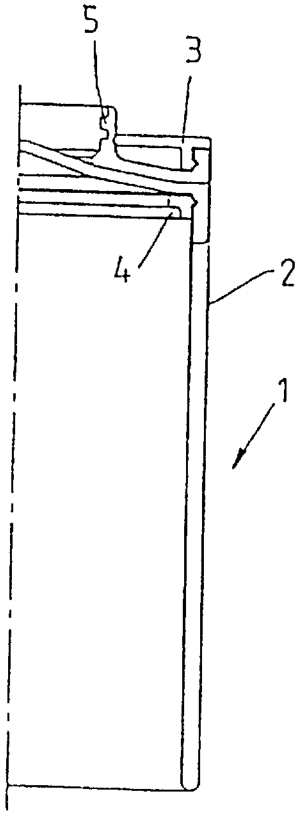
FIG. 3 a representation according to FIG. 1 in another operational state.
Figure 11:
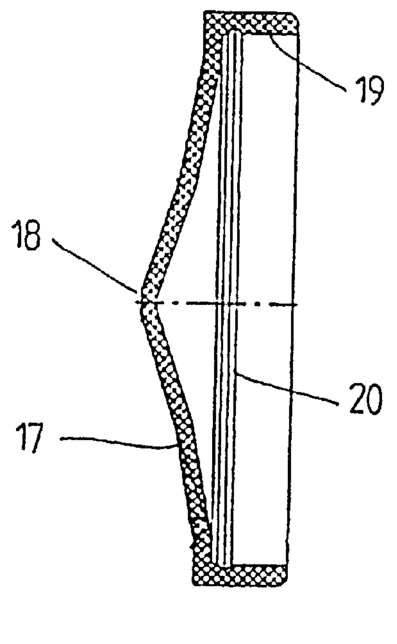
FIG. 11 a sectional view of the plunger according to FIG. 10.
Figure 10:
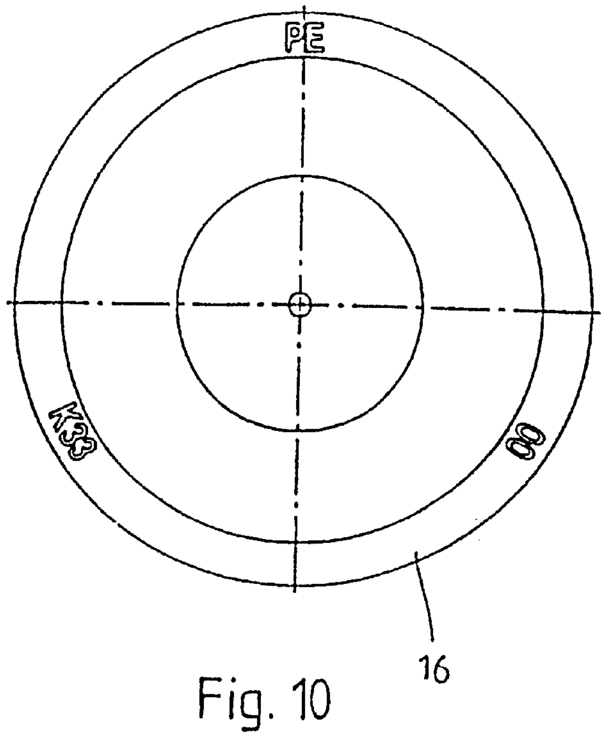
FIG. 10 a plan view of a plunger.

The disclosed embodiment shows that without auxiliary elements the cartridge shown in FIGS. 1 through 3 can be produced with simple means by clip or clamping connections. All of the disclosed elements can be coated or embodied so as to be diffusion-resistant. Conventionally, the disclosed lid and plunger elements are made of HDPE which is physiologically innocuous and very inexpensive. Of course, these elements can be protected against diffusion, for example, by an aluminum coating or covering. Also, the sleeve material can be correspondingly folded over and fastened.

It has been shown that the combination of functional bodies with clamping elements allows for a multi-step clamping action so that, for example, the foil can be clamped in the area of the cover member at a plurality of locations in transitional areas which increases the stability and sealing action. Multiple deflections of the foil in the context of its fastening at the disclosed cover member and/or plunger elements also allow for the deflection and compensation of occurring forces.

Figure 16:
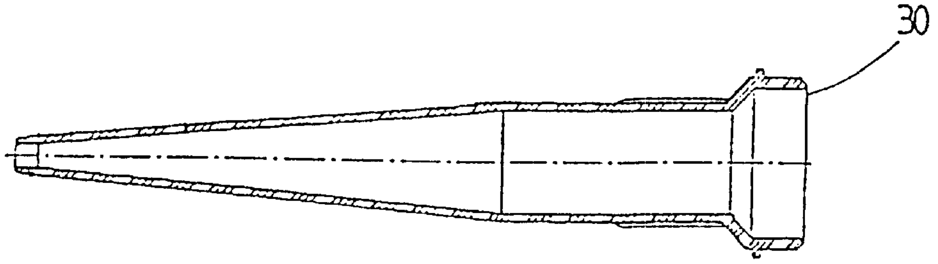
FIG. 16 a sectional view of the nozzle tip according to FIG. 15.
Figure 15:
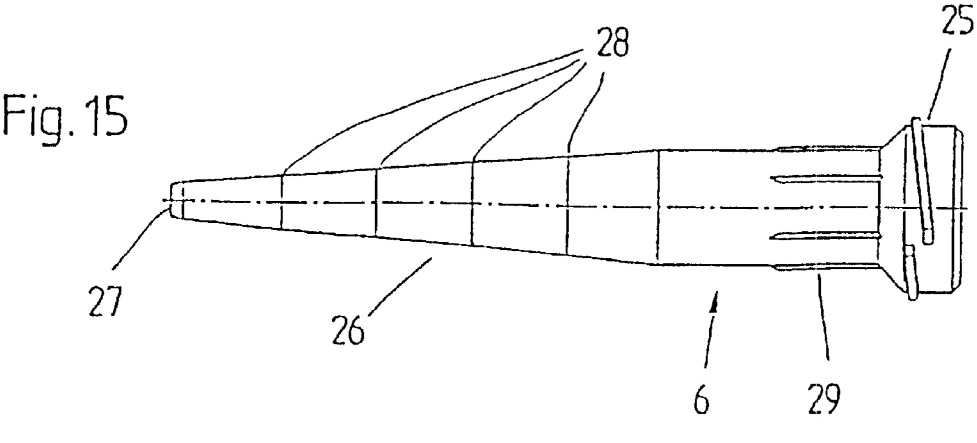
FIG. 15 a view of a nozzle tip.

In FIGS. 15 and 16 an embodiment for a nozzle 6 is shown which comprises a threaded portion 25 and a nozzle portion 26. The nozzle portion 26 comprises a nozzle tip 27 and furthermore a number of markings for openings 28 where the nozzle can be cut in order to achieve the desired defined through opening of a predetermined diameter. Conventionally, through openings of 3 mm at the tip, and with a jump of respectively 2 mm from opening to opening, are provided. In the area of the lower edge of the nozzle the outlet opening 30 is provided in an annular shape. In FIG. 1 the mounted position of the nozzle 6 at the cartridge 1 is shown whereby it is visible that the nozzle tip with its lowermost, beveled edge of the threaded portion rests sealingly at the tapered ring 41 within the opening socket 5. Furthermore, it tapers inwardly to form an outlet opening of a defined diameter. This contour in the threaded portion at the transition of the nozzle defines the dispensing opening which in cooperation with the plunger surface, the material viscosity, and the envelope flexibility ensures maintaining a minimum inner pressure within the cartridge, independent of the respective diameters resulting from cutting to length the nozzle.

In FIGS. 17 through 19 an embodiment of a closure cap 7 is shown which has also a threaded portion 31 and provides a cup-shaped closure. At the upper closure surface a grip stay 32 is provided which allows actuation of the closure cap. A bore 33 is provided within this grip stay 32 in the shown embodiment which allows for suspending the closed cartridge. Reinforcement ribs 34 on both sides of the grip stay 32 serve to stabilize it. In the interior of the cup-shaped closure cap 7 a bore 35 is defined. This bore 35 is embodied such that after completion of filling in the position shown in FIG. 2 a defined medium distribution and a defined inner pressure is ensured. A foil cover can be introduced into the closure cap, respectively, can be placed onto it and can be clamped within the thread. This closure cap serves as an original seal and must be destroyed before dispensing. It can be embodied so as to be diffusion-resistant in order to design the cartridge in its interior such that it is completely diffusion-tight.

FIG. 20 shows an embodiment of a pressure piston to be used with a dispensing device. This embodiment allows for further advantageous use of the invention. This pressure piston 36 comprises a cylindrical piston portion 37 with which pressure is applied onto the bottom of the plunger 4 of a cartridge 1. The cartridge 1, as shown in FIG. 1, is inserted advantageously into a tubular receiving member which at one end has an outlet opening for the nozzle 6 and serves as an abutment for the cover member 3. At the opposite end, pressure is applied to the bottom of the plunger 4 by the pressure piston 36. It is slowly displaced in the direction toward the cover member whereby due to the defined dispensing opening within the interior a minimum pressure is maintained which provides for a continuously tight envelope 2 that will not fold inwardly. Only this design ensures that the material of the envelope 2, after the plunger 4 has been moved within the envelope 2 so as to scrape the interior, is folded behind the plunger 4, as shown in FIG. 3. Upon further displacement of the plunger 4 the folded area will become longer and longer. With a pressure piston according to FIG. 20 the folded area behind the plunger 4 is thus extended more and more and displaced to the rear until the edge, respectively, annular groove 40 has been reached. Here the folded area is again deflected and slowly axially compressed. Further pressure is exerted onto the pressure piston 36 by the bottom plate 39. The pressure piston is guided in a tubular element whereby the guide edge 38 is substantially guided at the inner wall of the tube. The folded foil portion will remain along the inner wall of the tube in the folded form and will move slowly through the annular groove in the direction of the cylindrical wall portion of the piston area 37 where further folding, inverting etc. takes place. A cartridge that has been emptied and compressed as disclosed can be disposed of in a simple and space-saving manner.

In an advantageous manner the cartridges of the shown embodiments can be produced in various sizes. For example, filling volumes of approximately 600 ml are very suitable whereby the transport unit can be shortened to 300 ml which is approximately a length of 170 mm. A transport volume reduction by 60% relative to conventional cartridges can thus be achieved which have a total cartridge length of approximately 230 mm. Furthermore, the transported cartridge according to FIG. 3 is substantially free of air and can be directly pressure-filled. The plunger is then axially displaced such that the foil is tightened and the respective filling volume is achieved. Subsequently, a closure cap is attached whereby, as an original seal, a foil cap may be applied also. It can be, for example, a deep-drawn aluminum part. All stable plastic elements are advantageously made of HDPE, optionally coated with aluminum. The end position at the nozzle causes an increased pressure during the dispensing step within the envelope which results in that the foil cannot fold inwardly and is instead stabilized. This effect ensures that the plunger can glide along the inner side of the foil and can scrape it, whereby simultaneously the scraped foil is entrained so that the emptying of the cartridge below 1% is possible. With a pressure piston of a dispensing tool according to FIG. 20 a compression of up to approximately 15% of the original size is possible.

Figure 21:
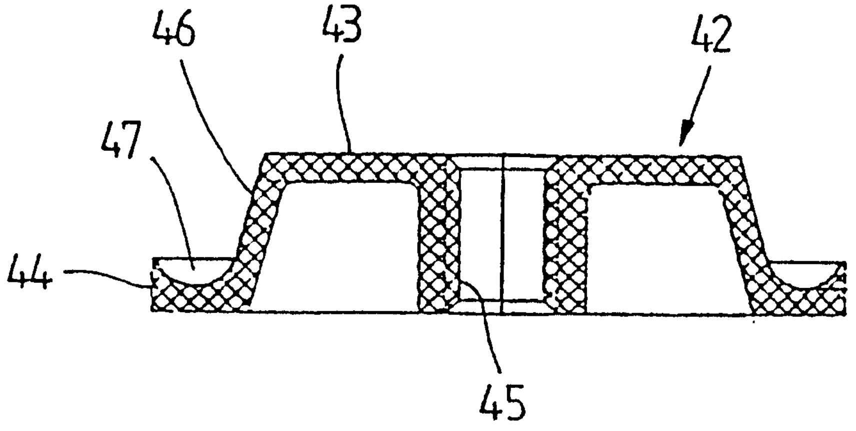
FIG. 21 a part-sectional view of a further embodiment of a pressure piston.
Figure 22:
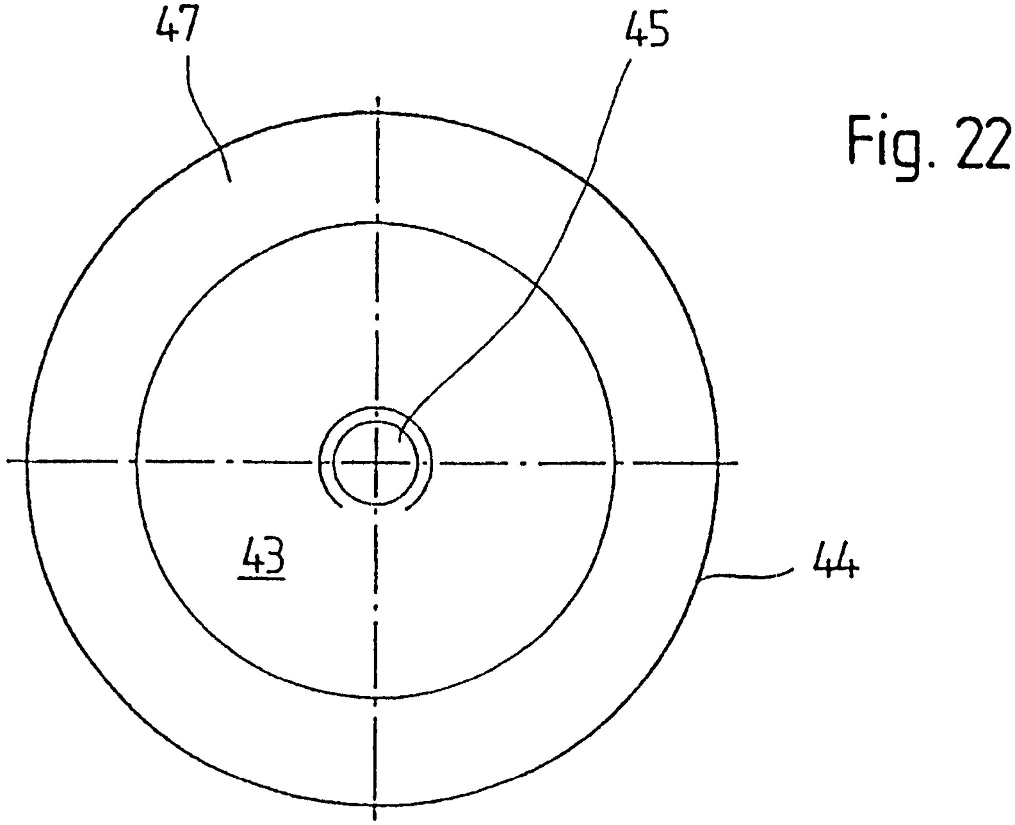
FIG. 22 a plan view of the embodiment according to FIG. 21.

The wall portion 46 of the piston as shown in the embodiment of FIGS. 21 and 22 is conical. At the opposite end an annular flange 44 is provided which has a fastening device for fastening thereto a dispensing device. In the case of FIG. 22 it is a thread or a clip, in the case of FIGS. 21 and 22 it is a threaded bore 45.

The annular flange comprises, at the surface facing in the direction of the pressure surface 43, an annular groove 47 which is suitable to radially support the envelope material moving along the piston wall and to tension it in order to provide in this manner for a directed folding.

Figure 23:
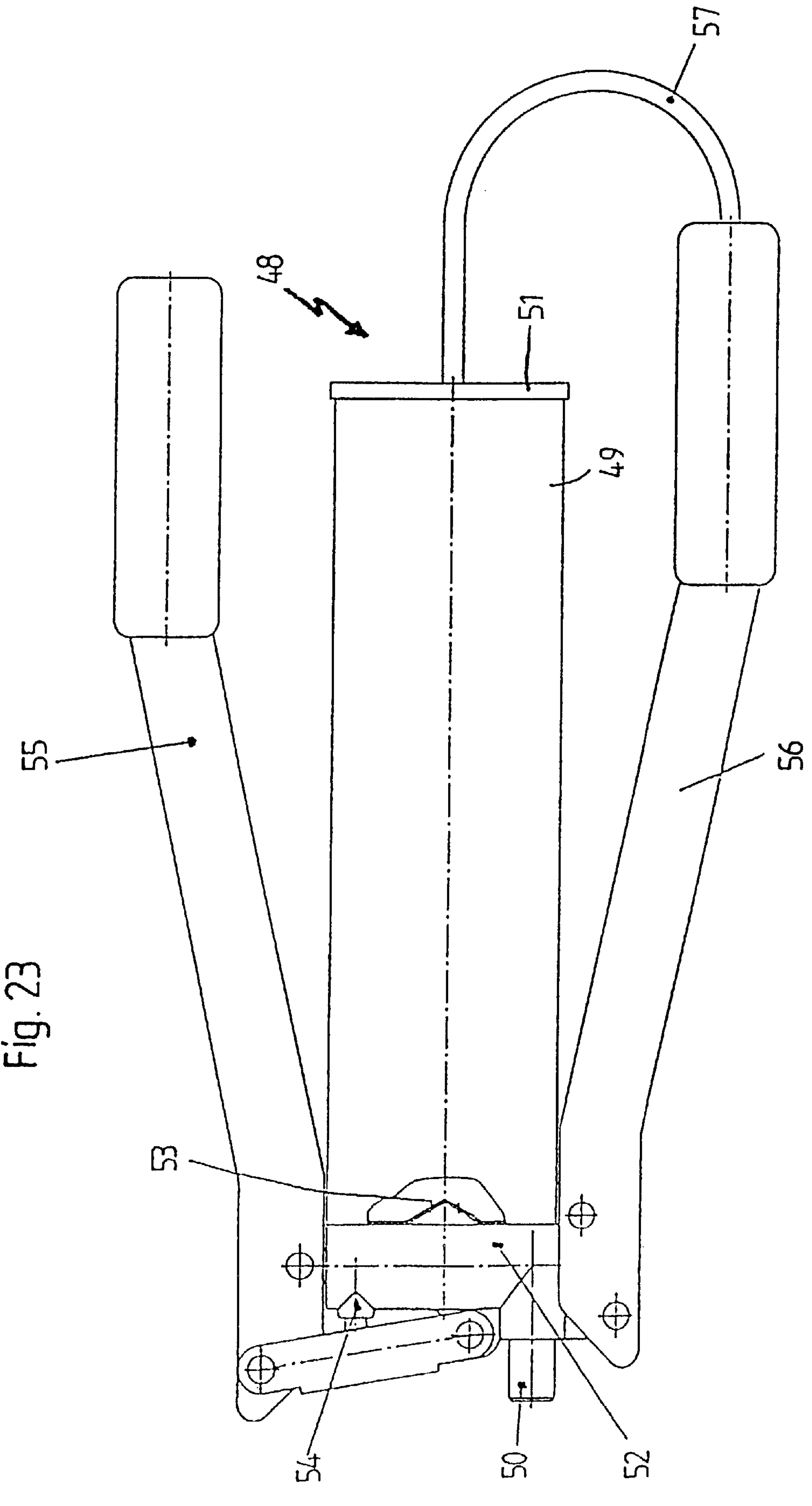
FIG. 23 a schematic representation of an embodiment for a dispensing device.

The device shown in FIG. 23 is a dispensing device 48 including a receiving tube 49 into which the cartridge is inserted in a manner known per se (not shown). At one end a dispensing opening 50 is provided, at the other end a lid is connectable.

At the dispensing side a piston (not shown) 52 is inserted with which, via the gear system 54 and the lever, stroke movements can be performed. A cartridge inserted into the receiving tube 49 is opened, connected to the dispensing area or, as shown in the shown embodiment, is opened by the opening device 53. The movement of the lever 55 reciprocates the piston via the gear system. At the side of the dispensing outlet 50 vacuum is produced, while at the side of the lid 51 increased pressure is produced. For this purpose, in the shown embodiment, the lever 56 is stationary and connected yo a line 57 for transmitting pressure.

The pressure transmission can also be performed differently so that both levers can be moved. The gear system design is without consequences in regard to the gist of the present invention.

The disclosed embodiments are for illustrative purposes only and are not limiting.

The present invention is, of course, in no way restricted to the specific disclosure of the specification and drawings, but also encompasses any modifications within the scope of the appended claims.

I claim:

1. Cartridge for flowable material, said cartridge comprising:

a flexible envelope having a first and a second opposed ends and defining an envelope volume for receiving the flowable material;

a plunger positioned at said first opposed end;

a cover member positioned at said second opposed end;

said second opposed end having a dispensing opening;

said dispensing opening having a dispensing diameter so dimensioned, according to a force exertable by said plunger in said envelope volume, a viscosity of the flowable material, and a flexibility of said envelope, as to ensure a minimum inner pressure in said envelope volume in order to prevent inward folding of said envelope into the interior of said envelope volume.

2. Cartridge according to claim 1, wherein said envelope is comprised of at least one foil strip.

3. Cartridge according to claim 2, wherein said foil strip consists of a plastic strip.

4. Cartridge according to claim 1, wherein said envelope comprises a diffusion-resistant material.

5. Cartridge according to claim 1 wherein said envelope comprises a fabric reinforcement.

6. Cartridge according to claim 1, wherein said envelope is a hose.

7. Cartridge according to claim 1, wherein said cover member is a disk or a cup.

8. Cartridge according to claim 7, wherein said cover member closes off said second opposed end of said envelope and is connected along its entire circumference to said envelope.

9. Cartridge according to claim 8, wherein said cover member comprises a groove and a clamping element, wherein said envelope is secured at said cover member by inserting said clamping element into said groove.

10. Cartridge according to claim 9, wherein said clamping element is a disk.

11. Cartridge according to claim 1, wherein said cover member consists of plastic.

12. Cartridge according to claim 11, wherein said cover member comprises a diffusion-resistant layer.

13. Cartridge according to claim 1, wherein said cover member comprises an outlet socket.

14. Cartridge according to claim 13, wherein said outlet socket comprises a thread.

15. Cartridge according to claim 1, comprising a closure cap for closing off said second opposed end.

16. Cartridge according to claim 15, wherein said closure cap has a stay-shaped grip.

17. Cartridge according to claim 15, wherein said closure cap has an inner bore.

18. Cartridge according to claim 1, further comprising a nozzle connected to said cover member.

19. Cartridge according to claim 1, wherein said plunger 4 is cup-shaped.

20. Cartridge according to claim 1, wherein said plunger consists of plastic.

21. Cartridge according to claim 1, wherein said plunger is connected to said first opposed end of said envelope and closes off said envelope.

22. Cartridge according to claim 1, wherein said plunger has a plunger surface and wherein said cover element has a bottom surface, wherein a contour of said plunger surface matches a contour of said bottom surface.

23. Cartridge according to claim 1, wherein said plunger has a wiping edge.

24. Cartridge according to claim 1, further comprising a clamping element, wherein said envelope is secured at said cover member by inserting said clamping element into at least one annular groove of said cover member.

25. Cartridge according to claim 1, wherein said plunger has reinforcement ribs.

26. Cartridge according to claim 1, wherein said cover member has an outlet and wherein said dispensing opening is located in the vicinity of said outlet of said cover member.

27. Cartridge according to claim 26, wherein said outlet comprises a tapering ring that tapers inwardly toward said envelope volume.

28. Cartridge according to claim 1, further comprising a nozzle connected to said cover member, wherein said dispensing opening is provided at said nozzle.

29. Cartridge according to claim 28, wherein said nozzle has a threaded portion and wherein said dispensing opening is provided within said threaded portion.

30. Cartridge according to claim 1 compressible by a pressure-applying dispensing device.

31. Dispensing device comprising:

a cylindrical receiving element for receiving a cartridge according to claim 1;

said cylindrical receiving element having two opposed end section, wherein one of said opposed end sections is a dispensing section for dispensing a flowable material contained in the cartridge;

a first device for producing a first pressure greater than normal pressure at one of said opposed end sections;

a second device for producing a second pressure smaller than normal pressure at the other one of said opposed end sections.

32. Dispensing device according to claim 31, wherein said first and second pressures are increased air pressure and decreased lowered air pressure, respectively.

33. Dispensing device according to claim 31, wherein said first and second devices are plungers.

34. Dispensing device according to claim 33, wherein said first and second devices are combined to a double piston element.

35. Dispensing device according to claim 31, further comprising levers for actuating said first and second devices.

36. Dispensing device according to claim 35, wherein said first and second devices comprise pressure lines for transmitting pressure from said first and second devices to said opposed end sections.

37. Dispensing device according to claim 36, wherein said pressure lines are arranged in one of said levers.

38. Pressure piston for a cartridge according to claim 1, said pressure piston comprising:

an annular wall portion having a first and a second end face;

a pressure surface connected to said first end face of said annular wall portion;

an annular flange connected to said second end face of said annular wall portion;

said annular flange having an annular groove opening toward said first end face.

39. Pressure piston according to claim 38, comprising a fastening device for a pressure element.

40. Pressure piston according to claim 39, wherein said fastening device is a central threaded bore.

41. Pressure piston according to claim 38, wherein said annular wall portion is conical.

42. Pressure piston according to claim 38, consisting of plastic.

* * * * *